US008406332B2

(12) United States Patent
Bayesteh et al.

(10) Patent No.: US 8,406,332 B2
(45) Date of Patent: Mar. 26, 2013

(54) DOWNLINK TRANSMISSION IN A MULTIPLE-USER MULTIPLE-INPUT MULTIPLE-OUTPUT ("MU-MIMO") WIRELESS COMMUNICATION SYSTEM

(75) Inventors: Alireza Bayesteh, Kitchener (CA); Amin Mobasher, Waterloo (CA); Hua Xu, Ottawa (CA); Yongkang Jia, Ottawa (CA); Yi Yu, Irving, TX (US); Jack Anthony Smith, Valley View, TX (US); Zhijun Sam Cai, Euless, TX (US); Shiwei Gao, Ottawa (CA)

(73) Assignee: Research In Motion Limited, Waterloo, Ontario (CA)

( * ) Notice: Subject to any disclaimer, the term of this patent is extended or adjusted under 35 U.S.C. 154(b) by 396 days.

(21) Appl. No.: 12/689,223

(22) Filed: Jan. 18, 2010

(65) Prior Publication Data

US 2011/0176629 A1 Jul. 21, 2011

(51) Int. Cl.
*H04B 7/02* (2006.01)
(52) U.S. Cl. ........ 375/267; 375/260; 375/295; 375/299; 375/316; 375/340; 375/347; 455/91; 455/101; 455/132; 455/296; 455/500; 455/562.1; 370/210; 370/344; 370/464; 370/480; 341/173; 341/180
(58) Field of Classification Search .................. 375/260, 375/267, 295, 299, 316, 340, 347; 455/91, 455/101, 132, 296, 500, 562.1; 370/210, 370/344, 464, 480; 341/173, 180
See application file for complete search history.

(56) References Cited

U.S. PATENT DOCUMENTS

| 7,629,902 | B2 | 12/2009 | Zhang et al. |
| 2007/0147536 | A1 | 6/2007 | Melzer et al. |
| 2009/0318183 | A1 | 12/2009 | Hugl et al. |
| 2009/0323849 | A1 | 12/2009 | Bala et al. |
| 2010/0002797 | A1 | 1/2010 | Sanayei |
| 2010/0322176 | A1* | 12/2010 | Chen et al. ..................... 370/329 |
| 2011/0032839 | A1* | 2/2011 | Chen et al. ..................... 370/252 |

OTHER PUBLICATIONS

European Patent Office, European Search Report, Application No. 10172950.7, Nov. 24, 2010.
Zhu, J., et al., Adaptive CQI Update and Feedback for Codebook Based MU-MIMO in E-UTRA, IEICE Trans. Commun. E92-B:1546-1552, May 2009.
Alcatel-Lucent, 'Best Companion' Reporting for Improved Single-Cell MU-MIMO Pairing, 3 GPP TSG RAN WG1 #56 Meeting, R1-090926, Athens, Greece, Feb. 9-13, 2009.

(Continued)

*Primary Examiner* — Leon Flores
(74) *Attorney, Agent, or Firm* — Oblon, Spivak, McClelland, Maier & Neustadt, L.L.P.

(57) ABSTRACT

Information transmission in a multiple-input multiple-output ("MIMO") wireless communication system is provided. In one embodiment, a method for transmitting information in a MIMO wireless communication system, comprising updating channel quality information ("CQI") values of a plurality of wireless devices, wherein updating said CQI values consider the effects of interference from transmissions to those wireless devices associated with a pre-assigned companion codeword set; pairing said plurality of wireless devices using at least said CQI values, a precoding matrix index ("PMI") value and said pre-assigned companion codeword set, wherein said pre-assigned companion codeword set, pre-assigned companion codewords associated with said pre-assigned companion codeword set and said PMI value are updated for each of said plurality of wireless devices; precoding the information for each of said plurality of wireless devices using said PMI value; and transmitting said precoded information to each of said plurality of wireless devices.

30 Claims, 7 Drawing Sheets

OTHER PUBLICATIONS

Rohde & Schwarz GmbH & Co. KG, UMTS Long Term Evolution (LTE) Technology Introduction, Application Note 1MA111, Sep. 2008.

Extended European Search Report for EP Application No. EP10172950, dated Nov. 24, 2010.

J. Zhu et al., Adaptive CQI Update and Feedback for Codebook Based MU-MIMO in E-UTRA, IEICE Transactions on Communications, Communications Society, Tokyo, JP vol. E92B, No. 5, May 1, 2009.

Alcatel-Lucent, Best Companion Reporting for Improved Single-Cell MU-MIMO Pairing, 3GPP Draft; R1-090926-MU-MIMP-BESTCOMP, 3rd Generation Partnership Project (3GPP), Mobile Competence Centre, 650, Route des Lucioles, F-06921 Sophia-Antipolis Cedex, France, Feb. 3, 2009.

* cited by examiner

DOWNLINK TRANSMISSION IN A MULTIPLE-USER MULTIPLE-INPUT MULTIPLE-OUTPUT ("MU-MIMO") WIRELESS COMMUNICATION SYSTEM

CROSS-REFERENCE TO RELATED APPLICATIONS

There are no related applications.

FIELD

The invention generally relates to wireless communication and in particular to downlink transmission in a multiple-user multiple-input multiple-output ("MU-MIMO") wireless communication system.

BACKGROUND

Wireless communication systems are widely deployed to provide, for example, a broad range of voice and data-related services. Typical wireless communication systems consist of multiple-access communication networks that allow users to share common network resources. Examples of these networks are time division multiple access ("TDMA") systems, code division multiple access ("CDMA") systems, single-carrier frequency division multiple access ("SC-FDMA") systems, orthogonal frequency division multiple access ("OFDMA") systems, or other like systems. An OFDMA system is adopted by various technology standards such as evolved universal terrestrial radio access ("E-UTRA"), Wi-Fi, worldwide interoperability for microwave access ("WiMAX"), ultra mobile broadband ("UMB"), and other similar systems. Further, the implementations of these systems are described by specifications developed by various standards bodies such as the third generation partnership project ("3GPP") and 3GPP2.

As wireless communication systems evolve, more advanced network equipment is introduced that provide improved features, functionality, and performance. A representation of such advanced network equipment may also be referred to as long-term evolution ("LTE") equipment or long-term evolution advanced ("LTE-A") equipment. LTE is the next step in the evolution of high-speed packet access ("HSPA") with higher average and peak data throughput rates, lower latency and a better user experience especially in high-demand geographic areas. LTE accomplishes this higher performance with the use of broader spectrum bandwidth, OFDMA and SC-FDMA air interfaces, and advanced antenna methods.

Communications between wireless devices and base stations may be established using single-input, single-output ("SISO") mode, where only one antenna is used for both the receiver and transmitter; single-input, multiple-output ("SIMO") mode, where multiple antennas may be used at the receiver and only one antenna is used at the transmitter; multiple-input, single-output ("MISO") mode, where multiple antennas may be used at the transmitter and only one antenna is used at the receiver; and multiple-input, multiple-output ("MIMO") mode, where multiple antennas may be used at the receiver and transmitter. Compared to SISO mode, SIMO mode may provide increased coverage while MIMO mode may provide increased coverage and spectral efficiency and higher data throughput if the multiple transmit antennas, multiple receive antennas or both are utilized. When wireless devices using MIMO mode are employed additional MIMO operating modes are available. These operating modes include diversity MIMO mode, single-user MIMO mode, multiple-user MIMO mode and mixed MIMO mode. Diversity MIMO-mode uses multiple transmit and receive antennas to take advantage of the spatial dimensionality of the wireless communication radio frequency ("RF") channel to provide more reliable transmission of a single data channel. It is important to recognize that systems employing base stations using MIMO mode can typically support wireless devices operating in SISO mode, SIMO mode, MISO mode, MIMO mode, other operating modes or combinations of operating modes.

Single-user MIMO ("SU-MIMO") mode takes advantage of the spatial dimensionality of the wireless communication RF channel by using multiple transmit and receive antennas to provide multiple concurrent transmission data channels for increased data rates of a single wireless device. Similarly, multiple-user MIMO ("MU-MIMO") mode uses multiple transmit and receive antennas to provide multiple concurrent transmission data channels to multiple wireless devices. Mixed MIMO mode concurrently supports the combination of SIMO and MIMO wireless devices on the same RF channel. Uplink ("UL") communication refers to communication from a wireless device to a base station. Downlink ("DL") communication refers to communication from a base station to a wireless device.

As specified in 3*rd Generation Partnership Project; Technical Specification Group Radio Access Network; Physical Channels and Modulation* (*Release* 8), 3GPP, 3GPP TS 36 series of specifications ("LTE Release 8"), the use of multiple antenna techniques is supported for DL transmission. In 3*rd Generation Partnership Project; Technical Specification Group Radio Access Network; Further Advancements For E-UTRA; Physical Layer Aspects* (*Release* 9), 3GPP, 3GPP TR 36.814 V1.1.1 (2009-06) ("LTE-A Release 10"), multiple antenna techniques may be used to improve DL performance. Such multiple antenna techniques include, for instance, transmit diversity and spatial multiplexing. Various transmit diversity schemes may be used such as space frequency block coding ("SFBC"), space time block coding ("STBC"), frequency switched transmit diversity ("FSTD"), time switched transmit diversity ("TSTD"), pre-coding vector switching ("PVS"), cyclic delay diversity ("CDD"), space code transmit diversity ("SCTD"), spatial orthogonal resource transmission diversity ("SORTD"), and other similar approaches. Some of these approaches have been adopted for use in LTE Release 8.

There has been extensive research on DL MU-MIMO transmission as can be found in the literature. One of the challenges in the implementation of DL MU-MIMO transmission is the effects of RF interference from signals transmitted to other wireless devices due to the lack of perfect channel state information ("CSI") at the base station and wireless devices. This may degrade the performance of DL MU-MIMO transmission dramatically and may even question the benefit of using DL MU-MIMO transmission. In LTE Release 8, more emphasis was placed on wireless device-transparent schemes in which the wireless device's operation is similar between SU-MIMO mode and MU-MIMO mode than on improving the performance of MU-MIMO mode. In LTE-A Release 10, new schemes for MU-MIMO mode have been proposed to improve system performance. Many of these new schemes are more complex and require more feedback and signaling overhead from the wireless device to the base station as compared to LTE Release 8 MU-MIMO modes. Thus, there is a need to provide a lower-complexity DL MU-MIMO transmission with limited feedback overhead while still achieving improved system performance.

DL MU-MIMO mode can be modeled as a MIMO broadcast channel ("MIMO-BC") in which a base station with multiple output antennas transmits multiple concurrent data channels to multiple wireless devices having multiple input antennas. Due to its simplicity, linear precoding has been considered a potential scheme for DL MU-MIMO mode. Linear precoding consists of linearly combining data channels to be transmitted to different wireless devices. This linear combination of data channels is performed to maximize the throughput of each wireless device. This requires the base station to have substantial knowledge of the channel state information ("CSI") as observed by each wireless device. In practical applications, it is unrealistic to have substantial knowledge of the CSI especially for systems operating in frequency division duplexing ("FDD") mode, which may require the wireless devices to feedback CSI to the base station. Thus, there is an additional need to provide solutions that require less knowledge of the channel state information at the transmitter ("CSIT").

Another advantage of using DL MU-MIMO mode is the paradoxical increase in system capacity as the number of wireless devices increase, which is also known as multi-user diversity gain. This concept means that the system can increase throughput by scheduling each wireless device's transmission on its most favorable RF channels.

The CSI feedback schemes considered for implementation in LTE-A Release 10 can be divided into explicit feedback schemes and implicit feedback schemes. Explicit feedback schemes feedback a substantial representation of CSI in the form of, for instance, a covariance matrix, eigenvector, other forms or combination of forms from each wireless device to the base station. Explicit feedback schemes provide improved performance but require transmitting a significant amount of CSI values from each wireless device to the base station. Alternatively, implicit feedback schemes feedback reduced representation of CSI in the form of, for instance, channel indication information from each wireless device to the base station. For example, LTE Release 8 provides for a reduced representation of CSI in the form of a channel quality indication ("CQI") data field, a precoding matrix index ("PMI") data field and a rank indication ("RI") data field.

While implicit feedback schemes provide less feedback information than explicit feedback schemes, implicit feedback schemes may have several disadvantages. The quantization error resulting from reduced representation of CSI may lead to increased interference from other wireless devices, which may degrade overall system performance. Further, the reduced representation of CSI may not contain enough channel information. This could inhibit the base station's ability to, for instance, suppress interference due to transmissions to other wireless devices, since in determining the reduced representation of CSI to be sent to the base station each wireless device may not know which other wireless devices it may be paired with by the base station.

One method to limit the resulting interference from other wireless devices is for each wireless device to also provide the base station with a best companion ("BC") report, which reports a codeword set that may result in the least amount of interference from base station transmissions to other wireless devices in MU-MIMO mode. This method can significantly reduce the amount of interference from transmissions to other wireless devices at the cost of additional feedback overhead.

In DL MU-MIMO transmission, another method to address the problem associated with interference from base station transmissions to other wireless devices is for the base station to estimate a CQI. Such estimated CQI is based on projecting the CQI feedback from each wireless device, which are determined based on SU-MIMO mode. By estimating such CQI, the effects of interference from transmissions to other wireless devices will be taken into account, which can lead to more accurate coding and modulation assignments for each wireless device. However, these CQI values estimated at the base station may not be sufficiently accurate or consistent since the base station may not have perfect knowledge of the channel or the receiver algorithms used by each wireless device.

BRIEF DESCRIPTION OF THE DRAWINGS

To facilitate this disclosure being understood and put into practice by persons having ordinary skill in the art, reference is now made to exemplary embodiments as illustrated by reference to the accompanying figures. Like reference numbers refer to identical or functionally similar elements throughout the accompanying figures. The figures along with the detailed description are incorporated and form part of the specification and serve to further illustrate exemplary embodiments and explain various principles and advantages, in accordance with this disclosure, where.

Figure 1:
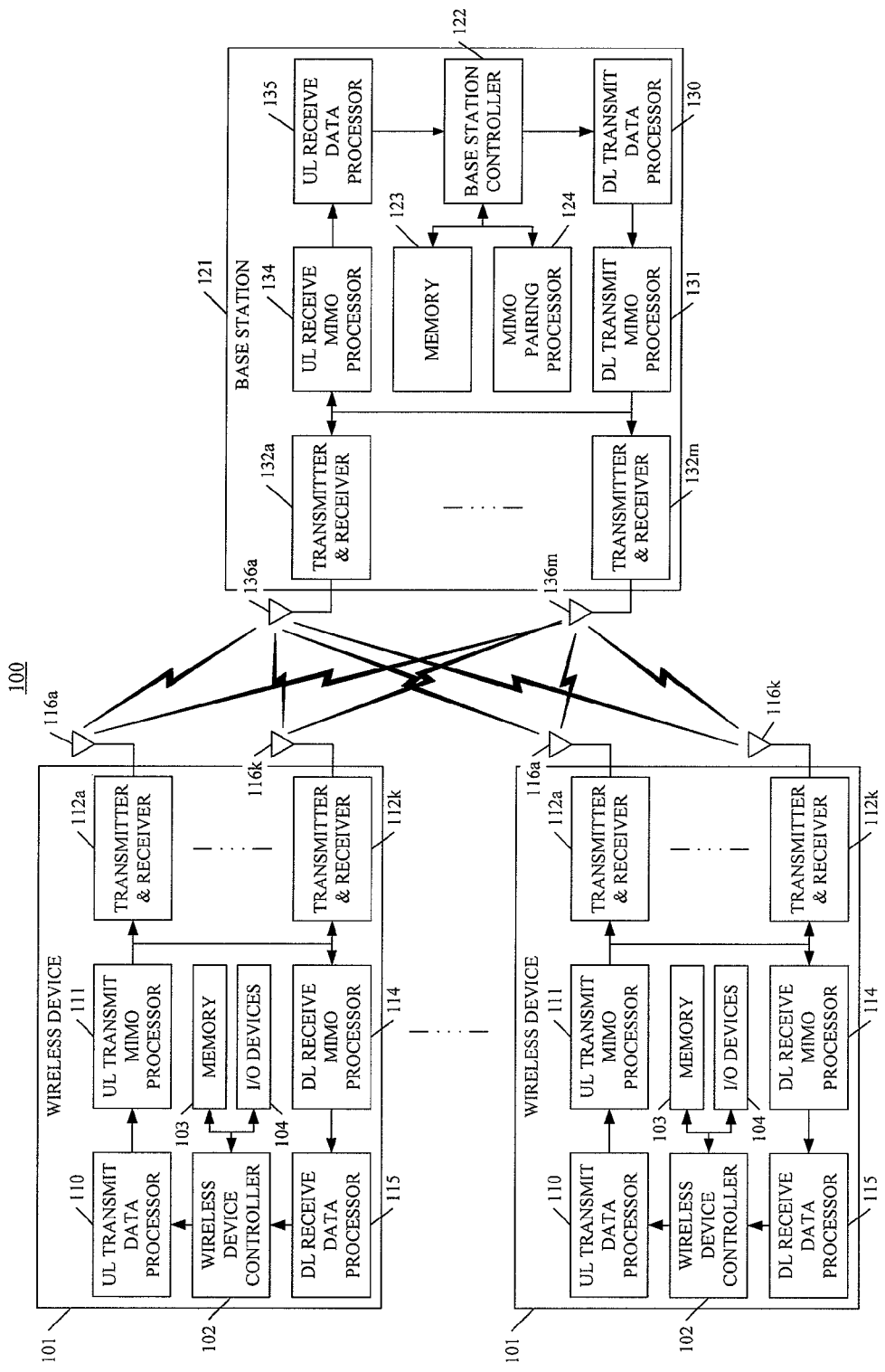
FIG. 1 illustrates one embodiment of a MU-MIMO wireless communication system in accordance with various aspects set forth herein.

Skilled artisans will appreciate that elements in the accompanying figures are illustrated for clarity, simplicity and to further help improve understanding of the embodiments, and have not necessarily been drawn to scale.

DETAILED DESCRIPTION

Although the following discloses exemplary methods, devices and systems for use in MIMO wireless communication systems, it will be understood by one of ordinary skill in the art that the teachings of this disclosure are in no way limited to the examplaries shown. On the contrary, it is contemplated that the teachings of this disclosure may be implemented in alternative configurations and environments. For example, although the exemplary methods, devices and systems described herein are described in conjunction with a configuration for aforementioned MIMO wireless communication systems, the skilled artisan will readily recognize that the exemplary methods, devices and systems may be used in other systems and may be configured to correspond to such other systems as needed. Accordingly, while the following describes exemplary methods, devices and systems of use thereof, persons of ordinary skill in the art will appreciate that the disclosed examplaries are not the only way to implement such methods, devices and systems, and the drawings and descriptions should be regarded as illustrative in nature and not restrictive.

Various techniques described herein can be used for various MIMO wireless communication systems. The various aspects described herein are presented as methods, devices and systems that can include a number of components, elements, members, modules, nodes, peripherals, or the like. Further, these methods, devices and systems can include or not include additional components, elements, members, modules, nodes, peripherals, or the like. In addition, various aspects described herein can be implemented in hardware, firmware, software or any combination thereof. Relational terms described herein such as "above" and "below", "left" and "right", "first" and "second", and the like may be used solely to distinguish one entity or action from another entity or action without necessarily requiring or implying any actual such relationship or order between such entities or actions. The term "or" is intended to mean an inclusive "or" rather than an exclusive "or." Further, the terms "a" and "an" are intended to mean one or more unless specified otherwise or clear from the context to be directed to a singular form. It is important to note that the terms "network" and "system" can be used interchangeably.

Wireless communication networks consist of a plurality of wireless devices and a plurality of base stations. A base station may also be called a node-B ("NodeB"), a base transceiver station ("BTS"), an access point ("AP"), or some other equivalent terminology. A base station typically contains one or more radio frequency ("RF") transmitters and receivers to communicate with wireless devices. Further, a base station is typically fixed and stationary. For LTE and LTE-A equipment, the base station is also referred to as an E-UTRAN NodeB ("eNB").

A wireless device used in a wireless communication network may also be referred to as a mobile station ("MS"), a terminal, a cellular phone, a cellular handset, a personal digital assistant ("PDA"), a smartphone, a handheld computer, a desktop computer, a laptop computer, a tablet computer, a set-top box, a television, a wireless appliance, or some other equivalent terminology. A wireless device may contain one or more RF transmitters and receivers, and one or more antennas to communicate with a base station. Further, a wireless device may be fixed or mobile and may have the ability to move through a wireless communication network. For LTE and LTE-A equipment, the wireless device is also referred to as user equipment ("UE").

This disclosure provides various embodiments of DL transmission in MU-MIMO wireless communication systems including embodiments for an implicit feedback scheme for DL transmission in MU-MIMO wireless communication systems. These embodiments provide multiple advantages over the prior art. First, these embodiments can use the same or similar amount of feedback information as used for DL transmission in SU-MIMO wireless communication systems. These embodiments may not require, for instance, an explicit BC report as typically used with other MU-MIMO schemes. For instance, LTE Release 8 uses precoding codebooks for wireless devices operating in SU-MIMO mode. By using the same precoding codebook set for wireless devices operating in MU-MIMO mode, the embodiments of this disclosure can provide the same or similar amount of feedback information irrespective of whether SU-MIMO mode, MU-MIMO mode or both is used by the wireless devices. This provides the advantage that the MIMO feedback mode can be transparent to each wireless device. Second, these embodiments can support the reporting of accurate CQI values to the base station, which may be required for pairing and link adaptation. Further, each wireless device does not require the base station to provide CQI values of other wireless devices to support its MU-MIMO transmission. Third, the embodiments of this disclosure can allow the base station to support easy and flexible scheduling and pairing. Fourth, these embodiments can result in improved system throughput and performance.

FIG. 1 illustrates one embodiment of MU-MIMO wireless communication system 100 in accordance with various aspects set forth herein. In one embodiment, system 100 can include one or more wireless devices 101 and one or more base stations 121. In accordance with one aspect, wireless device 101 can include wireless device controller 102 coupled to memory 103, input/output devices 104, UL transmit data processor 110, UL transmit MIMO processor 111, transmitters and receivers 112a to 112k, DL receive MIMO processor 114, DL receive data processor 115 or any combination thereof, which can be utilized by wireless device 101 to implement various aspects described herein. Transceiver 108 of wireless device 101 includes one or more transmitters 107 and one or more receivers 106. Further, associated with wireless device 101, one or more transmitters and receivers 112a to 112k are connected to one or more antennas 116a to 116k. FIG. 1 illustrates wireless device 101 twice and can be interpreted as representing a plurality of different wireless devices 101.

Similarly, base station 121 can include base station controller 122 coupled to memory 123, MIMO pairing processor 124, DL transmit data processor 130, DL transmit MIMO processor 131, transmitters and receivers 132a to 132m, UL receive MIMO processor 134, UL receive data processor 135 or any combination thereof, which can be utilized by base station 121 to implement various aspects described herein. Further, associated with base station 121, one or more transmitters and receivers 132a to 132m are connected to one or more antennas 136a to 136m.

Base station 121 can communicate with wireless device 101 on the UL and on the DL using one or more antennas 116a to 116k and 136a to 136m, associated with wireless device 101 and base station 121, respectively. In one embodiment, base station 121 can originate DL information using one or more transmitters 132a to 132m and one or more antennas 136a to 136m, where it can be received by one or more receivers 112a to 112k at wireless device 101 using one or more antennas 116a to 116k. This information can be related to one or more communication links between base station 121 and wireless device 101. Once information is received by wireless device 101 on the DL, wireless device 101 can process the received information to generate a response relating to the received information. This response can then be transmitted back from wireless device 101 on the UL using one or more transmitters 112a to 112k and one or more antennas 116a to 116k, and received at base station 121 using one or more antennas 136a to 136m and one or more receivers 132a to 132m.

In this embodiment, base station 121 has M antennas and there are N wireless devices 101 in the system where each wireless device 101 has K antennas 116a to 116k. L wireless devices 101 are paired where each wireless device 101 receives t streams of data. In another embodiment, the product of L paired wireless devices 101 and t data streams of each wireless device 101 should be less than or equal to K total antennas per wireless device 101 to improve the ability of wireless devices 101 to perform interference rejection and cancellation ("IRC") using minimum mean squared error ("MMSE") algorithms or other similar algorithms. The channel matrix for the $i^{th}$ wireless device 101 is denoted by $H_i$. Using an implicit feedback scheme for DL MU-MIMO mode, the channel of each wireless device 101 can be quantized by a codebook consisting of $2^B$ codewords. For example, LTE Release 8 provides codebooks for B=4 and L=1. Wireless devices 101 can provide PMI values to base station 121 based on the quantization index. Each wireless device 101 can find its codeword index using the following equation:

$$\mathcal{J}_i = \underset{l=1:2^B}{\arg\max} \|H_i w_l\|^2, \quad (1)$$

where $w_l$, $l=1, \ldots, 2^B$ are the codewords in the codebook.

A set of size m pre-assigned companion codewords for the codeword $w_l$ is defined as the set of m codewords in the codebook with the maximum Chordal distance to $w_l$. If more than m codewords are found to have the same or greater Chordal distance to $w_l$, then the codewords that empirically result in improved performance can be selected. For example, TABLE 1 shows a codebook for B=4 and t=1, which can be used for a rank-1 MU-MIMO transmission, in addition to the codebook in LTE release 8.

TABLE 1

| ROW | SPATIAL LAYER | | | |
|---|---|---|---|---|
| | 1 | 2 | 3 | 4 |
| 1 | $\begin{bmatrix}1\\1\\1\\j\end{bmatrix}$ | $\begin{bmatrix}1\\1\\-1\\-j\end{bmatrix}$ | $\begin{bmatrix}1\\-1\\1\\-j\end{bmatrix}$ | $\begin{bmatrix}1\\-1\\-1\\j\end{bmatrix}$ |
| 2 | $\begin{bmatrix}1\\1\\j\\1\end{bmatrix}$ | $\begin{bmatrix}1\\1\\-j\\-1\end{bmatrix}$ | $\begin{bmatrix}1\\-1\\j\\-1\end{bmatrix}$ | $\begin{bmatrix}1\\-1\\-j\\1\end{bmatrix}$ |
| 3 | $\begin{bmatrix}1\\j\\1\\1\end{bmatrix}$ | $\begin{bmatrix}1\\j\\-1\\-1\end{bmatrix}$ | $\begin{bmatrix}1\\-j\\1\\-1\end{bmatrix}$ | $\begin{bmatrix}1\\-j\\-1\\1\end{bmatrix}$ |
| 4 | $\begin{bmatrix}1\\j\\j\\-j\end{bmatrix}$ | $\begin{bmatrix}1\\j\\-j\\j\end{bmatrix}$ | $\begin{bmatrix}1\\-j\\j\\j\end{bmatrix}$ | $\begin{bmatrix}1\\-j\\-j\\-j\end{bmatrix}$ |

In this codebook, codewords in the same row can be mutually orthogonal to each other. Hence, for the case of m=3, all codewords in the same row can be considered as pre-assigned companion codewords.

Figure 2:
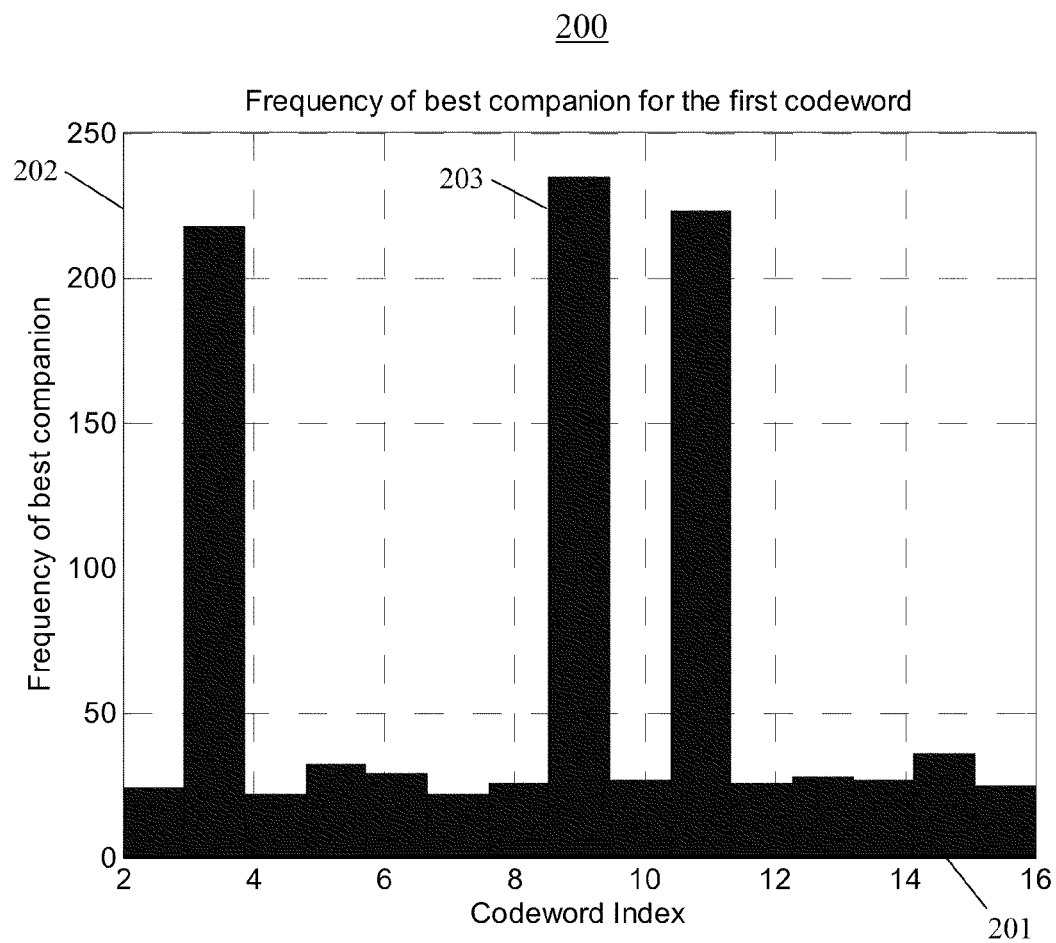
FIG. 2 is an example of a best companion selection method in accordance with various aspects set forth herein.

FIG. 2 is an example of the results of a best companion selection method of MU-MIMO wireless communication system 100 in accordance with various aspects set forth herein. The graphical illustration in its entirety is referred to by 200. The codeword index is shown on abscissa 201 and is plotted in the range from the second codeword to the sixteenth codeword. The frequency of the best companion codewords for the first codeword is shown on ordinate 202 and is plotted in the range from zero, corresponding to zero frequency, to 250, corresponding to a frequency of two hundred and fifty. Bar 203 represents the largest frequency of the best companion codewords and corresponds to the ninth codeword.

Based on the simulation results of FIG. 2, for m=1 the first codeword can select the ninth codeword in the codebook indexing table given by TABLE 2 as its best companion, since the highest frequency of the best companion is the ninth codeword. For the remainder of the codewords, similarly, the codebook index of the best companion codeword of codeword i for m=1 can be set to, for instance, (8+i)mod 16. In general, the best companion codeword can be pre-assigned using a predetermined lookup table. For example, the companion codeword index of the codeword with an index of three can be calculated as (8+3) mod 16=11. In another example, the companion codeword index of the codeword with an index of ten can be calculated as (8+10) mode 16=2.

TABLE 2

| ROW | CODEWORD INDEX | | | |
|---|---|---|---|---|
| 1 | 1 | 3 | 9 | 11 |
| 2 | 2 | 4 | 10 | 12 |
| 3 | 5 | 7 | 13 | 15 |
| 4 | 6 | 8 | 14 | 16 |

Each wireless device 101 computes its multiple-user CQI ("MU-CQI") values, which consider the effect of interference from other wireless devices 101 associated with the pre-assigned companion codeword set. Various embodiments exist for computing MU-CQI values, due to various options for wireless device pairing. For example, for t=1, representing single-layer transmission; K=4 antennas per wireless device 101; and m=3 pre-assigned companion codewords, MU-CQI can be calculated based on the number of paired wireless devices 101. In one embodiment, for L=4 paired wireless devices 101, all pre-assigned companion codewords can be considered in the interference term. For wireless devices 101 with receivers 112a to 112k using the minimum mean squared error interference rejection and cancellation ("MMSE-IRC") algorithm, the post-receiver signal to interference noise ratio ("SINR") can be computed using the following equation:

$$SINR_{4_i} = \frac{SNR}{4} w_i^H H_i^H \left( I + \frac{SNR}{4} \sum_{l=1}^{3} H_i w_{i,bc}(l) w_{i,bc}^H(l) H_i^H \right)^{-1} H_i w_i, \quad (2)$$

where $SINR_{4_i}$ denotes the SINR when four wireless devices 101 are expected to be paired and $w_{i,bc}(l)$ denotes the $l^h$ pre-assigned companion codeword. The mapping between $SINR_{4_i}$ and $MU\text{-}CQI_4$ can be performed in the same or similar manner as for SU-MIMO mode in LTE Release 8.

In another embodiment, for L=2 paired wireless devices 101, a maximum of three MU-CQI values can be calculated and reported from wireless device 101 to base station 121 dependent on which pre-assigned companion codeword is used. The corresponding SINR for the $l^{th}$ MU-CQI value can be computed using the following equation:

$$SINR_{2_i}(l) = \frac{SNR}{2} w_i^H H_i^H \left( I + \frac{SNR}{2} H_i w_{i,bc}(l) w_{i,bc}^H(l) H_i^H \right)^{-1} H_i w_i, \quad (3)$$

$l = 1, 2$ and 4, where $SINR_{2_i}(l)$ denotes the SINR when the $i^{th}$ and $l^{th}$ wireless devices 101 are expected to be paired. The mapping between the $SINR_{2_i}(l)$ and $MU\text{-}CQI_2$ can be performed in the same manner as, for instance, SU-MIMO mode in LTE Release 8.

Figure 3:
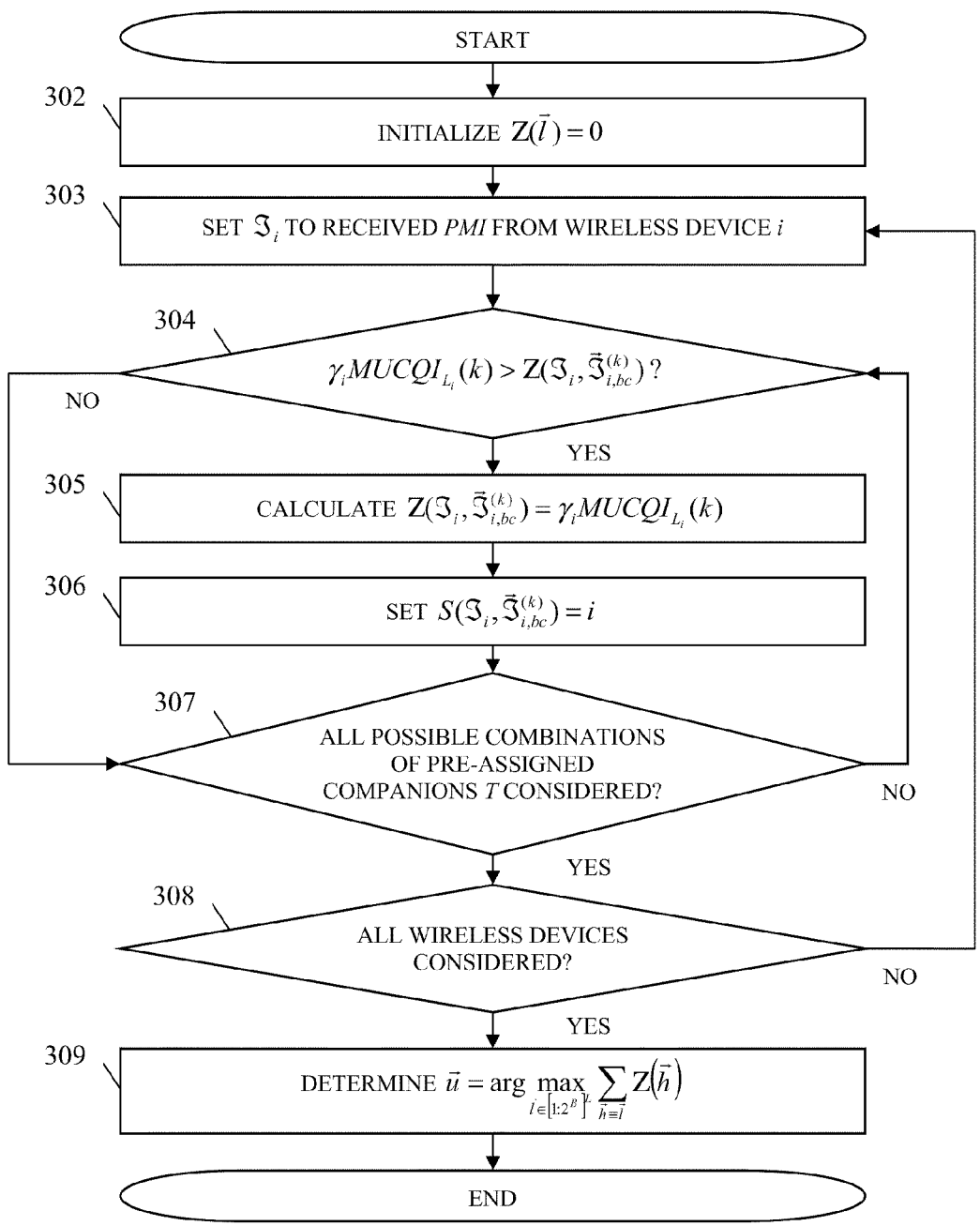
FIG. 3 is a flow chart of one embodiment of a pairing method in accordance with various aspects set forth herein.

After receiving the feedback information, MIMO pairing processor 124 of base station 121 can perform a pairing algorithm. FIG. 3 is a flow chart of one embodiment of the aforementioned pairing method 300 used in MU-MIMO wireless communication system 100 in accordance with various aspects set forth herein. In method 300, the PMI index for the wireless device 101 is denoted by $\Im_i$ and a vector of size L−1 containing the potential pre-assigned companion codeword indices to be paired with the $i^{th}$ wireless device 101 is denoted by $\vec{\Im}_{i,bc}^{(k)}$. The total number of possible combinations of the pre-assigned companions for computing MU-CQI values is denoted by T. For example, if m=3 and L=2, T will be equal to 3. The weighting parameter, which can be dependent on the type of scheduler, is denoted by $\gamma_i$. For instance, the proportional fairness ("PF") scheduler can use a $\gamma_i$ that is inversely proportional to the average data throughput of the $i^{th}$ wireless device 101. The max-sum-throughput scheduler, which maximizes the sum-rate throughput of the system, can set $\gamma_i=1$.

In FIG. 3, method 300 can start at block 301, where method 300 can initialize the metric matrix, $Z(\vec{l})$, to zero as given by the following equation:

$$Z(\vec{l})=0, \text{ where } \vec{l} \in [1:2^B]^L \quad (4)$$

At block 303, method 300 receives the PMI index, $\Im_i$, for the $i^{th}$ wireless device 101 sent by wireless devices 101. The $i^{th}$ wireless device 101 calculated its PMI value using the following equation:

$$\Im_i = \arg\max_{l=1:2^B} \|H_i w_l\|^2 \quad (5)$$

At block 304, method 300 can determine whether the weighted MU-CQI value, $\gamma_i MUCQI_{L_i}(k)$, for the $i^{th}$ wireless device 101 is greater than the metric value, $Z(\Im_i, \vec{\Im}_{i,bc}^{(k)})$ and is given, for instance, by the following equation:

$$\gamma_i MUCQI_{L_i}(k) > Z(\Im_i, \vec{\Im}_{i,bc}^{(k)}) \quad (6)$$

The weighted MU-CQI value, $\gamma_i MUCQI_{L_i}(k)$, is the product of the weighted parameter, $\gamma_i$, for the $i^{th}$ wireless device 101 and the MU-CQI value, $MUCQI_{L_i}(k)$, for the $i^{th}$ wireless device 101 and the $k^{th}$ combination of the potential pre-assigned companion codewords. The metric value, $Z(\Im_i, \vec{\Im}_{i,bc}^{(k)})$, is generated using the PMI index, $\Im_i$, for the $i^{th}$ wireless device 101 and the vector, $\vec{\Im}_{i,bc}^{(k)}$, containing the potential pre-assigned companion codeword indices for the $i^{th}$ wireless device 101 for the $k^{th}$ combination of potential pre-assigned companion codewords.

If this condition is valid, then at block 305, method 300 sets the weighted MU-CQI value, $\gamma_i MUCQI_{L_i}(k)$, to the metric value, $Z(\Im_i, \vec{\Im}_{i,bc}^{(k)})$ as given by the following equation:

$$Z(\Im_i, \vec{\Im}_{i,bc}^{(k)}) = \gamma_i MUCQI_{L_i}(k) \quad (7)$$

At block 306, method 300 stores the index, $S(\Im_i, \vec{\Im}_{i,bc}^{(k)})$, of the corresponding wireless device 101 as given by the following equation:

$$S(\Im_i, \vec{\Im}_{i,bc}^{(k)}) = i \quad (8)$$

If the condition at block 304 is not valid, then at block 307, method 300 determines whether all T combinations of the potential pre-assigned companion codewords have been considered. If all possible combinations have not been considered, then method 300 returns to block 304 to consider the next possible combination.

If all possible combinations have been considered, then at block 308, method 300 determines whether all wireless devices 101 have been considered. If all wireless devices 101 have not been considered, then method 300 returns to block 303 to consider the next wireless device 101.

If all wireless devices 101 have been considered, then at block 309, method 300 calculates the utility function, $\vec{u}$, as the sum of the weighted MU-CQI values for each codeword index, l, and the companion index set, c(l), to determine a set of wireless devices 101 that maximize the utility function, $\vec{u}$, is selected. The utility function, $\vec{u}$, can be generated using, for instance, the following equation:

$$\vec{u} = \arg\max_{\vec{l} \in [1:2^B]^L} \sum_{\vec{h}=\vec{l}} Z(\vec{h}) \quad (9)$$

The paired wireless devices 101 are given by $\{S(\vec{v})\}_{\vec{v}=\vec{u}}$. After wireless devices 101 are paired, base station 121 performs precoding based on the PMI of the paired wireless devices 101.

In summary, for each codeword index, l, and companion index set, c(l), the weighted MU-CQI values, $\gamma_i MUCQI_{L_i}(k)$, for wireless devices 101 with PMI index equal to l and companion index set, c(l), is stored in the metric matrix, Z(l, c(l)), and the index of the corresponding wireless device 101 is stored in S(l, c(l)).

Method 300 can also be applied so that it is transparent to wireless devices 101 operating in system 100. For example, in another embodiment, system 100 can be configured so that, for instance, base station 121 has four antennas, M=4; two wireless devices 101, L=2, paired with each wireless device 101 having two antennas, K=2; and the pre-assigned companion codeword set is of size one, m=1. Thus, the total number of possible combinations of the pre-assigned companions for computing MU-CQI values is one, T=1, and each wireless device 101 computes the MU-CQI for only one companion codeword. In this embodiment, only one MU-CQI value per iteration can be sent to base station 121 from each wireless device 101. To make method 300 transparent to wireless devices 101, each wireless device 101 can send to base station 121, for instance, SU-CQI values as baseline values and CQI difference values representing the difference between SU-CQI values and MU-CQI values. This embodiment requires no additional signaling to instruct wireless devices 101 to use SU-MIMO mode or MU-MIMO mode. A person of ordinary skill in the art will recognize that sending CQI difference values from wireless device 101 to base station 121 requires less data bandwidth than sending the absolute MU-CQI values.

Figure 4:
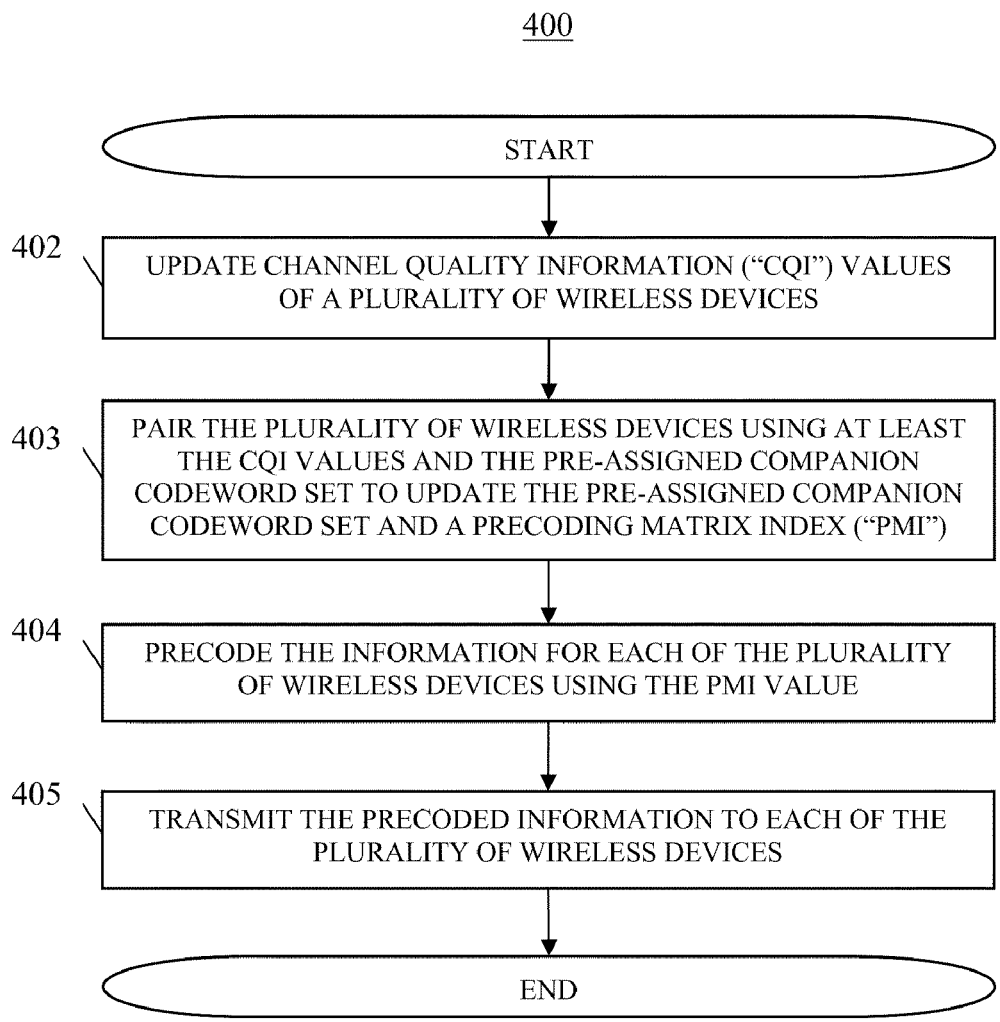
FIG. 4 is a flow chart of one embodiment of a DL transmission method in a MU-MIMO wireless communication system in accordance with various aspects set forth herein.

FIG. 4 is a flow chart of one embodiment of DL transmission method 400 in MU-MIMO wireless communication system 100 in accordance with various aspects set forth herein. In FIG. 4, method 400 can start at block 402, where method 400 can update CQI values of a plurality of wireless devices 101. Method 400 may use the SU-CQI values, MU-CQI values or both to update the CQI values. Such CQI values can be measured at wireless devices 101, estimated at base station 121 or both. Method 400 may also use the SU-CQI values and CQI difference values to update the CQI values, wherein the CQI difference values represent the difference between the SU-CQI values and the MU-CQI values. At block 402, method 400 can also update the PMI values, pre-assigned companion codeword or both. In addition, method 400 can also consider the effects of interference from transmissions to those wireless devices 101 with a pre-assigned companion codeword set when updating the CQI values. At block 403, method 400 can pair the plurality of wireless devices 101 using at least the CQI values and the pre-assigned companion codeword set to update the pre-assigned companion codeword. The pre-assigned companion codeword set can be updated using various methods and such updated codewords can be communicated from base station 121 to wireless device 101. At block 404, method 400 can precode the information for each of the plurality of wireless devices 101 using the PMI value, or using PMI values and pre-assigned companion codewords. Finally, at block 405, method 400 can transmit the precoded information to each of the plurality of wireless devices 101.

Figure 5:
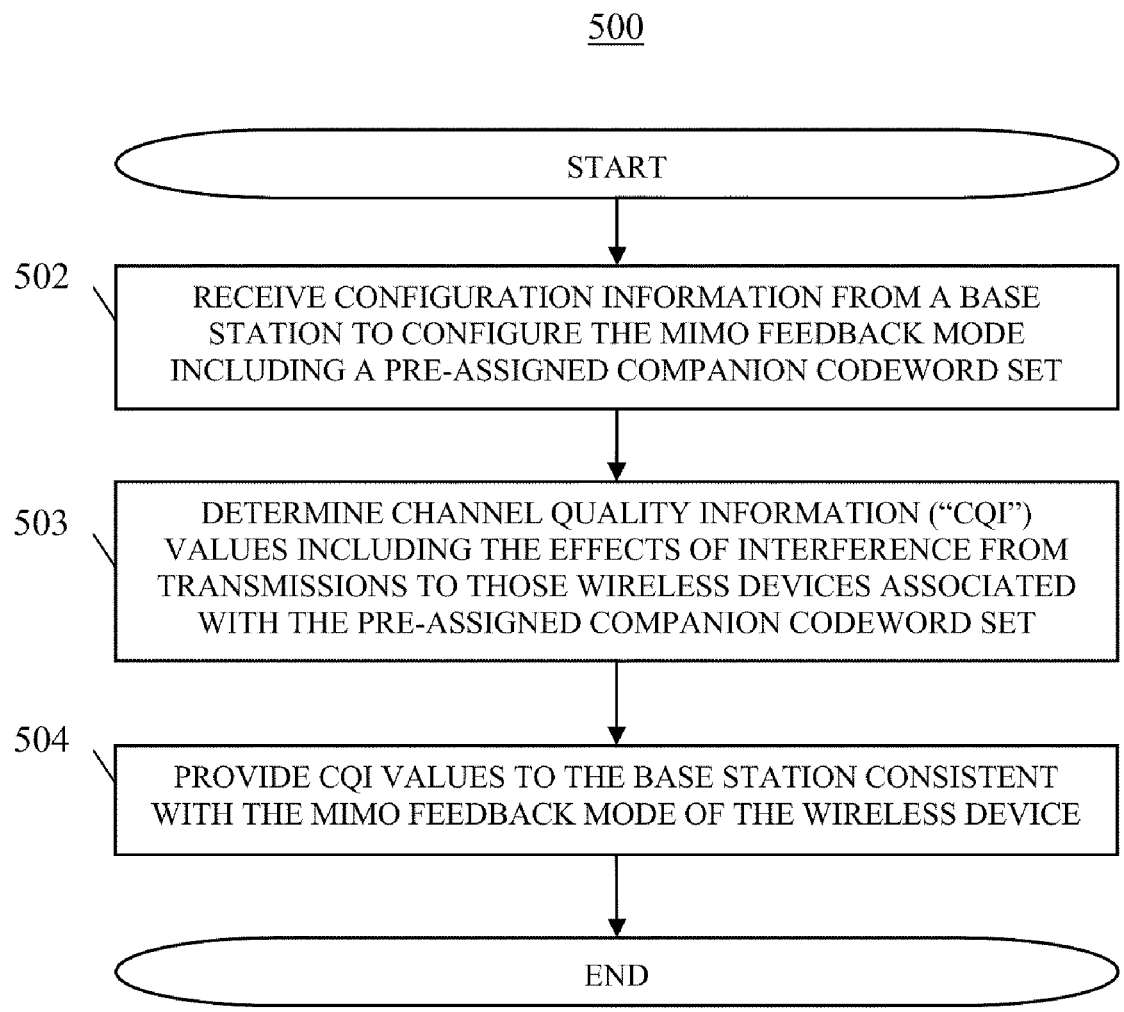
FIG. 5 is a flow chart of one embodiment of a DL transmission support method in a MU-MIMO wireless communication system in accordance with various aspects set forth herein.

FIG. 5 is a flow chart of one embodiment of DL transmission support method 500 in MU-MIMO wireless communication system 100 in accordance with various aspects set forth herein. In FIG. 5, method 500 can start at block 502, where method 500 can receive configuration information from base station 121 wherein the configuration information configures the MIMO feedback mode of wireless device 101 and includes a pre-assigned companion codeword set. At block 503, method 500 can determine a PMI value and codewords from the corresponding pre-assigned companion codeword set. Further, method 500 can also determine CQI values, which may include the effects of transmissions to those wireless devices 101 associated with the pre-assigned companion codeword set. Method 500 may use SU-CQI values, MU-CQI values or both to update the CQI values. Method 500 may also use the SU-CQI values and CQI difference values to update the CQI values, wherein the CQI difference values represent the difference between the SU-CQI values and the MU-CQI values. At block 504, method 500 can provide CQI values to base station 121 with the MIMO feedback mode of wireless device 101.

Figure 6:
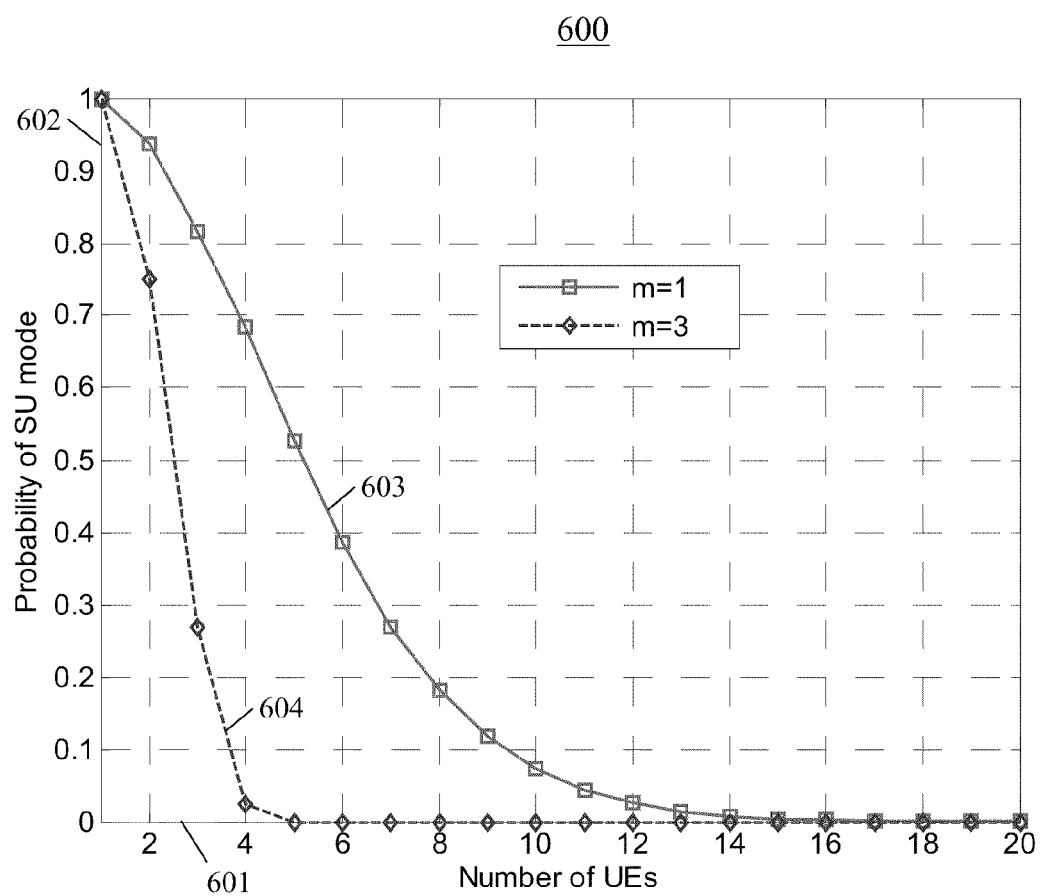
FIG. 6 illustrates simulated results of the performance of DL transmission in one embodiment of a MU-MIMO wireless communication system in accordance with various aspects set forth herein.

FIG. 6 illustrates simulated results of the performance of DL transmission in one embodiment of MU-MIMO wireless communication system 100 in accordance with various aspects set forth herein, where the performance of system 100 was measured using base station 121 with four antennas, M=4, two paired wireless devices 101, L=2, with each having two antennas, K=2. The graphical illustration in its entirety is referred to by 600. The number of wireless devices is shown on abscissa 601 and is plotted in the range from 1 wireless device to 20 wireless devices. The probability of base station 121 configuring the wireless devices 101 for SU-MIMO mode is shown on ordinate 602 and is plotted in the range from zero, corresponding to zero probability, to one, corresponding to one hundred percent probability. Graphs 603 and 604 represent simulation results for system 100. Graph 603 shows the probability of base station 121 configuring the wireless devices 101 for SU-MIMO mode for a pre-assigned companion codeword set of size one, m=1. Graph 604 shows the probability of base station 121 configuring wireless devices 101 for SU-MIMO mode for a pre-assigned companion codeword set of size three, m=3.

In general, increasing the pre-assigned companion codeword set, m, increases the flexibility of base station 121 to pair wireless devices 101 but at the expense of increasing the feedback overhead. Hence, it is important to select the appropriate size of the pre-assigned companion codeword set, m, to achieve the proper balance between system performance and feedback overhead. For example, in a wireless communication system, base station 121 has four antennas, M=4; each wireless device 101 has two antennas, K=2; and the base station 121 can pair two wireless devices 101, L=2. For a pre-assigned companion codeword set of size one, m=1, only one MU-CQI value can be computed by wireless device 101 and sent to base station 121. In contrast, for a pre-assigned companion codeword set of size three, m=3, three MU-CQI values can be computed by wireless device 101 and sent to base station 121, which can also be realized by sending one SU-CQI value and three CQI difference values, allowing for the MU-CQI values to be determined. For a pre-assigned companion codeword set of size three, m=3, base station 121 has more flexibility to pair wireless devices 101, especially when the total number of wireless devices 101 is small. Alternatively, for a pre-assigned companion codeword set of size one, m=1, and for a small number of wireless devices 101, base station 121 will likely place wireless devices 101 in SU-MIMO mode.

The pre-assigned companion codeword set can be selected by base station 121 based on, for instance, the number of active wireless devices 101 associated with base station 121. In one embodiment, base station 121 can use, for instance, three pre-assigned companion codeword sets with the number of pre-assigned companion codewords in each set defined as $m_1$, $m_2$, and $m_3$ where $m_1 > m_2 > m_3$. Base station 121 can communicate to wireless devices 101 which set to use. Base station 121 can communicate with wireless device 101 using, for instance, point-to-point communication, point-to-multipoint communication or both to instruct wireless devices 101 on which pre-assigned companion codeword set to use. Base station 121 can provide point-to-multipoint communication to wireless devices 101 by using a logical channel, a transport channel or both. For instance, base station 121 may use a logical channel such as a broadcast control channel ("BCCH") to instruct wireless devices 101 on which pre-assigned companion codeword set to use. An example of the information field within a BCCH message used to communicate the pre-assigned companion codeword set is described in TABLE 3. A person of ordinary skill in the art will recognize that other configurations of the information field may be used to convey the pre-assigned companion codeword set from base station 121 to wireless devices 101.

TABLE 3

| INDICATION BIT FIELD | NUMBER OF PRE-ASSIGNED COMPANION CODEWORDS | COMMENT |
| --- | --- | --- |
| 00 | $m_1$ | Corresponds to a lower number of active wireless devices |
| 01 | $m_2$ | Corresponds to a nominal number of active wireless devices |
| 10 | $m_3$ | Corresponds to a higher number of active wireless devices |
| 11 | Wireless device specific | Base station indicates to each wireless device which codeword set to use |

When the indication bit field of the BCCH message is set to the binary value of "11," base station 121 can individually configure each wireless device 101 to use a specific codeword set. For example, base station 121 can configure a particular wireless device 101 when, for instance, base station 121 configures the feedback CQI values for such wireless device 101.

Base station 121 can also periodically or aperiodically update which codebook set to use and communicate the selected codebook set by setting the appropriate binary value in the indication bit field of the BCCH message. As the active wireless device count changes, base station 121 may configure wireless devices 101 to use a different codebook set. For example, as the number of active wireless devices increases, base station 121 can broadcast a BCCH message to wireless devices 101 to change from using a codebook set of size $m_2$ to a codebook set of size $m_3$.

It is important to note that there is no limitation in this disclosure for the number of paired wireless devices 101 or the number of transmission layers per wireless device 101. A person of ordinary skill in the art will recognize that the amount of feedback overhead is affected by the number of wireless devices, the potential combinations of paired wireless devices, the number of spatial layers per wireless device or any combination thereof. In another embodiment, each wireless device 101 may select its "most favorite" combination of paired wireless devices, wherein these combinations are most likely to result in improved performance.

In another embodiment, base station 121 can statically configure, dynamically configure or both wireless devices 101 to use a certain number of transmission layers when operating in MU-MIMO mode. For example, for wireless communication system 100 with two active wireless devices 101, K=2, base station 121 can configure wireless devices 101 to use an RI value of one or two, corresponding to one or two transmission layers, respectively. For an RI value of one, wireless device 101 reports MU-CQI values for rank one and reports SU-CQI values for rank one. For an RI value of two, wireless device 101 reports MU-CQI values for rank one and reports SU-CQI values for rank two. Furthermore, the wireless device 101 may utilize the information of a pre-assigned codeword set to perform MIMO interference rejection, cancellation or both at the receiver.

As another example, for wireless communication system 100 with four active wireless devices 101, K=4, base station 121 can configure wireless devices 101 to use an RI value of one, two, three or four, corresponding to one, two, three or four transmission layers, respectively. For an RI value of one, wireless device 101 reports MU-CQI values for rank one and SU-CQI values for rank one. For an RI value of two, wireless device 101 reports MU-CQI values for rank two and SU-CQI values for rank two. For an RI value of three, wireless device 101 reports MU-CQI values for rank 2 and SU-CQI values for rank 3. For an RI value of four, wireless device 101 reports MU-CQI values for rank 2 and SU-CQI values for rank 4.

Figure 7:
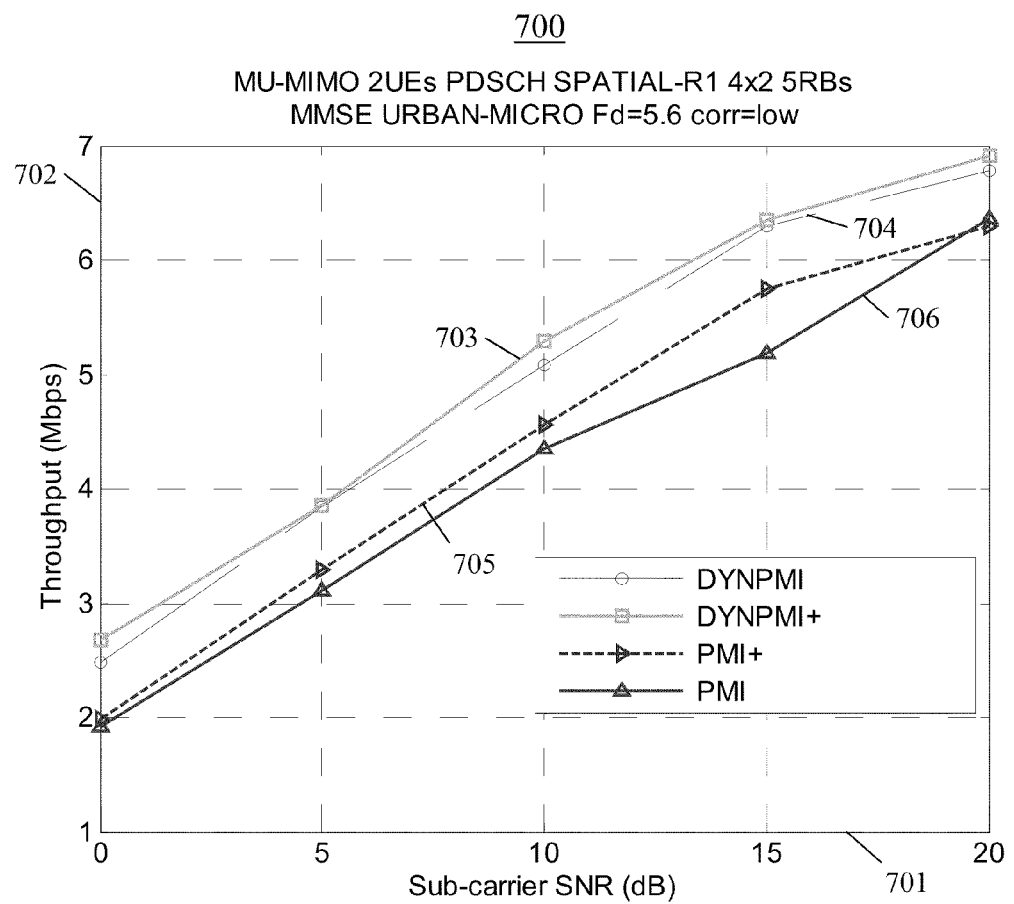
FIG. 7 illustrates simulated results of the performance of DL transmission in another embodiment of a MU-MIMO wireless communication system in accordance with various aspects set forth herein.

FIG. 7 illustrates simulated results of the performance of DL transmission in another embodiment of system 100 in accordance with various aspects set forth herein, where the performance of system 100 was measured using base station 121 with four antennas, M=4, two paired wireless devices 101, L=2, with each having two antennas, K=2. In addition, the link-level simulation set the following parameters: the channel model used the spatial channel modeling ("SCM") urban-micro delay spread model with a 3 km fading model; the system bandwidth was 10 MHz; five resource blocks were assigned corresponding to narrow band operation; the wireless device pairing was based on MU-CQI values and PMI values; the total number of wireless devices in the system was ten, N=10; the link adaptation was based on reported MU-CQI values from each wireless device used to select the modulation and coding scheme ("MCS"); the feedback from each wireless device to the base station was PMI values and MU-CQI values on the assigned bandwidth; the LTE Release 8 DL codebook was used for the PMI codebook; two wireless devices were paired with each wireless device using only one layer; and MMSE-IRC was the receiver algorithm used at the wireless device. A person of ordinary skill in the art will recognize that many different combinations of the aforementioned parameters can be used as well as different assignments for the aforementioned parameters. For example, the PMI codebook could use, for instance, the codebook of TABLE 1.

The graphical illustration in its entirety is referred to by 700. The sub-carrier SNR is shown on abscissa 701 and is plotted in the range from 0 decibels ("dB") to 20 dB. The DL data throughput is shown on ordinate 702 and is plotted in the range from 1 million bits per second ("Mbps") to 7 Mbps. Graphs 703, 704, 705 and 706 represent the simulation results for system 100. Graph 703 shows the DL data throughput for a pre-assigned companion codeword set of size three, m=3. Graph 704 shows the DL data throughput for a pre-assigned companion codeword set of size one, m=1. Graph 705 shows the DL data throughput for a scheme in which the pairing is performed solely based on the PMI feedback, but the link adaptation is performed using MU-CQI values. Similar to the scheme of Graph 705, Graph 706 shows the DL data throughput for a scheme in which each wireless device sends two companion codewords in addition to its PMI feedback.

Base station 121 can provide an efficient method for supporting DL transmission for SU-MIMO and MU-MIMO modes of operation in system 100. Further, this method can be used in systems such as LTE and LTE-A. In one embodiment, base station 121 can configure wireless devices 101 to provide SU-MIMO feedback from wireless device 101 to base station 121 by broadcasting the configuration to wireless devices 101, using higher-layer signaling to configure a particular wireless device 101, other methods of configuration or any combination thereof.

In another embodiment, base station 121 can configure one or more wireless devices 101 to change the type, rate, amount or any combination thereof of feedback information sent from each wireless device 101 to base station 121 to improve the performance of system 100. For example, base station 121 can configure wireless device 101 to provide additional feedback information to base station 121 when system 100 has, for instance, a larger number of wireless devices 101. As another example, base station 121 can configure wireless device 101 to provide additional feedback information to base station 121 when system 100 has, for instance, one or more wireless devices 101 configured for MU-MIMO mode or could potentially be configured in MU-MIMO transmission. The additional feedback information sent from wireless device 101 to base station 121 can be information that is beyond the feedback information specified by, for instance, LTE Release 8.

Base station 121 can configure the type, rate, amount or any combination thereof of additional feedback information for wireless device 101 by broadcasting the configuration to wireless devices 101, using higher-layer signaling to configure one or more wireless devices 101, other methods of configuration or any combination thereof. In one example, base station 121 can broadcast, use higher-layer signaling or both to configure one or more wireless devices 101 to, for instance, periodically provide additional feedback information. In another example, base station 121 can use downlink control information ("DCI"), which is information carried on a physical downlink control channel ("PDCCH"), to dynamically configure one or more wireless devices 101 to, for instance, aperiodically provide feedback information. Base station 121 can configure various attributes of one or more wireless devices for MU-MIMO transmission such as the number of wireless devices potentially paired in MU-MIMO transmission, rank restrictions in potential MU-MIMO transmissions (e.g. configuring rank one for MU-MIMO transmission), other attributes or combination of attributes.

In another embodiment, base station 121 can dynamically configure one or more wireless devices 101 for SU-MIMO transmission, MU-MIMO transmission or both based on the use of, for instance, LTE Release 8 feedback information and any additional feedback information sent by wireless devices 101 to base station 121. For example, base station 121 may pair those wireless devices 101 for MU-MIMO transmission whose PMI share the same value as the companion codeword of the other wireless devices 101. Base station 121 can then use additional CQI feedback information, which may be determined based on MU-MIMO transmissions for the corresponding MCS assignment. However, if the PMI value from a wireless device 101 does not share the same value of the companion codeword of any other wireless device 101, then base station 121 may configure wireless devices 101 for SU-MIMO mode using, for instance, LTE Release 8 PMI values, CQI values or both as feedback information.

In another embodiment, base station 121 can assist wireless device 101 in selecting its receiver type by indicating in a DL grant to wireless device 101 whether MU-MIMO transmission is scheduled.

In another embodiment, after base station 121 configures wireless device 101 to provide additional feedback, wireless device 101 can generate, for instance, LTE Release 8 PMI, CQI and RI values associated with SU-MIMO transmission as well as the additional feedback information such as PMI, CQI and RI values associated with MU-MIMO transmission. The PMI values associated with the additional feedback information can include, for instance, the best companion PMI or best companion PMI set. The best companion PMI or the set of best companion PMIs can be selected in the companion codeword set in, for instance, the LTE Release 8 codebook or any extended LTE-A Release 10 codebook. The companion codeword set can be constructed for each codeword using various criteria such as the Chordal distance. Further, such companion codeword set can be constructed for each codeword with a different rank and can be known by both base station 121 and wireless device 101.

The best companion PMI can be explicitly or implicitly fed back from wireless device 101 to base station 121. For implicit PMI feedback, the best companion codeword can be pre-determined for each codeword and is known at base station 121 and wireless device 101. Upon receiving the PMI feedback from wireless device 101, base station 121 can derive its best companion PMI using this pre-determined rule. For explicit PMI feedback, for example, an absolute 4-bit PMI index or a 2-bit PMI index to cluster can be used to indicate the best companion PMI for each codeword. As another example, a 2-bit subset index can be used to indicate the relative location of the best companion PMI in a companion codeword set as defined here.

Additional CQI values can be calculated based on an MU-MIMO transmission assumption and associated with the companion PMI. The MU-MIMO transmission is assumed that other wireless devices 101 paired for MU-MIMO transmission can use other PMIs in the companion codeword set. A set of CQI values can be generated assuming that different PMIs in the companion codeword set are used for MU-MIMO transmission. Wireless device 101 can feedback a single CQI value or multiple CQI values based on the generated CQI values using various methods such as providing CQI values assuming that, for instance, each PMI in the companion codeword is paired with wireless device 101 in MU-MIMO transmission; providing CQI values which are above a certain threshold; providing CQI values which are the minimum of all generated CQI values; providing CQI values which are the maximum of all generated CQI values; providing CQI values which are the average of all generated CQI values; providing the CQI value when wireless device 101 is paired with all the PMI values in the companion codeword set, which is the lower bound of all the CQI values for MU-MIMO transmission; or any combination thereof.

The additional MU-MIMO CQI value can be fed back to base station 121 as a wideband CQI value or a number of sub-band CQI values. The additional MU-MIMO CQI value can also be fed back to base station 121 as CQI difference values relative to a SU-MIMO CQI value, which can be a wideband or sub-band CQI value. Since an SU-MIMO CQI value may be larger than the corresponding MU-MIMO CQI value, such a CQI difference value may be a negative value. The additional sub-band MU-MIMO CQI values can be fed back as CQI difference values relative to a wideband MU-MIMO CQI value. When there are multiple PMI values and CQI values fed back to base station 121, a pre-determined relation between each PMI value and CQI value may implicitly or explicitly exist. The feedback of additional MU-MIMO CQI values and the means to generate such values can be configurable and can be coupled with existing LTE Release 8 SU-MIMO feedback modes. Wireless device 101 can then feedback LTE Release 8 PMI, CQI and RI values, as well as any additional feedback for MU-MIMO mode such as CQI difference values. When indicated in, for instance, an MU-MIMO transmission, wireless device 101 may select the best receiver type such as MMSE or MMSE-SIC, MMSE-IRC for optimal decoding.

Having shown and described exemplary embodiments, further adaptations of the methods, devices and systems described herein may be accomplished by appropriate modifications by one of ordinary skill in the art without departing from the scope of the present disclosure. Several of such potential modifications have been mentioned, and others will be apparent to those skilled in the art. For instance, the exemplars, embodiments, and the like discussed above are illustrative and are not necessarily required. Accordingly, the scope of the present disclosure should be considered in terms of the following claims and is understood not to be limited to the details of structure, operation and function shown and described in the specification and drawings.

As set forth above, the described disclosure includes the aspects set forth below.

What is claimed is:

1. A method for transmitting information in a multiple-input multiple-output ("MIMO") wireless communication system, comprising:
updating channel quality information ("CQI") values of a plurality of wireless devices, wherein updating said CQI values consider the effects of interference from transmissions to those wireless devices associated with a pre-assigned companion codeword set;
pairing said plurality of wireless devices using at least said CQI values, a precoding matrix index ("PMI") value and said pre-assigned companion codeword set, wherein said pre-assigned companion codeword set, a pre-assigned companion codeword associated with said pre-assigned companion codeword set and said PMI value are updated for each of said plurality of wireless devices;
precoding the information for each of said plurality of wireless devices using said PMI value, said pre-assigned companion codeword or both; and transmitting said precoded information to each of said plurality of wireless devices.

2. The method of claim 1, wherein updating said channel quality information ("CQI") values further comprise:
using single-user channel quality information ("SU-CQI) values, multiple-user channel quality information ("MU-CQI") values or both to update said CQI values.

3. The method of claim 1, wherein updating said channel quality information ("CQI") values further comprise:
using single-user channel quality information ("SU-CQI") values and CQI difference values to update said CQI values, wherein said CQI difference values represent the difference between said SU-CQI values and multiple-user channel quality information ("MU-CQI") values.

4. The method of claim 1, wherein said channel quality information ("CQI") is calculated at said wireless devices and sent to a base station, estimated by said base station or both.

5. A base station in a multiple-input multiple-output ("MIMO") wireless communication system, comprising:
a base station controller configured to receive feedback information including channel quality information ("CQI") values from a plurality of wireless devices, wherein said CQI values include the effects of interference from transmissions to those wireless devices associated with a pre-assigned companion codeword set;
a MIMO pairing processor operative to pair said plurality of wireless devices using at least said CQI values and said pre-assigned companion codeword set, wherein pairing said plurality of wireless devices updates said pre-assigned companion codeword set and a precoding matrix index ("PMI") value for each of said plurality of wireless devices;
a downlink ("DL") transmit MIMO processor operative to precode the information for each of said plurality of wireless devices using said PMI value; and
a plurality of transmitters operative to use a plurality of antennas to transmit said precoded information to each of said plurality of wireless devices.

6. The base station of claim 5, wherein said base station controller is further configured to use single-user channel quality information ("SU-CQI) values, multiple-user channel quality information ("MU-CQI") values or both to update said channel quality information ("CQI") values.

7. The base station of claim 6, wherein the feedback of said single-user channel quality information ("SU-CQI") values is compatible with long-term evolution ("LTE") equipment.

8. The base station of claim 6, wherein the feedback of said multiple-user channel quality information ("MU-CQI") values is configured as additional said feedback information.

9. The base station of claim 5, wherein said base station controller is further configured to use single-user channel quality information ("SU-CQI") values and channel quality information ("CQI") difference values to update said CQI values, wherein said CQI difference values represent the difference between said SU-CQI values and multiple-user channel quality indication ("MU-CQI") values.

10. The base station of claim 5, wherein said base station controller can change periodically, aperiodically or both said pre-assigned companion codeword set.

11. The base station of claim 5, wherein said base station controller can change the type, rate, amount or any combination thereof of said feedback information, wherein said feedback information includes single-user channel quality information ("SU-CQI") values, multiple-user channel quality information ("MU-CQI") or both.

12. The base station of claim 5, wherein said base station controller can change said pre-assigned companion codeword set to control the performance of the system.

13. The base station of claim 5, wherein said base station controller can change said pre-assigned companion codeword set based on the number of said wireless devices associated with the base station.

14. The base station of claim 5, wherein said base station controller can communicate said pre-assigned companion codeword set, a precoding matrix index ("PMI") value or both to each of said plurality of wireless devices.

15. The base station of claim 5, wherein said base station controller can communicate periodically, aperiodically or both said pre-assigned companion codeword set, a precoding matrix index ("PMI") value or both to each of said plurality of wireless devices.

16. The base station of claim 5, wherein said base station controller can communicate said pre-assigned companion codeword set, a precoding matrix index ("PMI") value or both to each of said plurality of wireless devices by using point-to-point communication, point-to-multipoint communication or both.

17. The base station of claim 5, wherein said base station controller can communicate said pre-assigned companion codeword set to each of said plurality of wireless devices by sending a broadcast control channel message ("BCCH").

18. The base station of claim 5, wherein said base station controller can communicate said pre-assigned companion codeword set, a precoding matrix index ("PMI") value or both to each of said plurality of wireless devices by sending a wireless device-specific control channel message ("PDCCH").

19. The base station of claim 5, wherein said base station controller can determine the number of transmission layers for each of said plurality of wireless devices.

20. A wireless device in a multiple-input multiple-output ("MIMO") wireless communication system, comprising:
a downlink ("DL") receive MIMO processor configured to determine channel quality information ("CQI") values including for transmissions to those wireless devices associated with a pre-assigned companion codeword set; and
a wireless device controller configured to receive configuration information wherein said configuration information configures the MIMO feedback mode of a wireless device and includes said pre-assigned companion codeword set, and to feedback said CQI values to a base station consistent with the MIMO feedback mode of said wireless device.

21. The wireless device of claim 20, wherein said downlink ("DL") receive MIMO processor is further configured to calculate single-user channel quality information ("SU-CQI) values, multiple-user channel quality information ("MU-CQI") values or both to determine said channel quality information ("CQI") values.

22. The wireless device of claim 20, wherein said downlink ("DL") receive MIMO processor is further configured to determine said CQI values by calculating single-user channel quality information ("SU-CQI") values and channel quality information ("CQI") difference values, wherein said CQI difference values represent the difference between said SU-CQI values and multiple-user channel quality information ("MU-CQI") values.

23. The wireless device of claim 20, wherein said wireless device controller can feedback to said base station the wireless device's preferred combination of paired wireless devices based on said pre-assigned companion codeword set.

24. The wireless device of claim 20, wherein said downlink ("DL") receive MIMO processor performs interference rejection, cancellation or both using said pre-assigned companion codeword set.

25. A method for supporting information transmission in a multiple-input multiple-output ("MIMO") wireless communication system, comprising:
receiving configuration information from a base station, wherein said configuration information configures the MIMO feedback mode of a wireless device and includes a pre-assigned companion codeword set;
determining channel quality information ("CQI") values including the effects of interference from transmissions to those wireless devices associated with said pre-assigned companion codeword set; and
providing said CQI values to said base station consistent with the MIMO feedback mode of said wireless device.

26. The method of claim 25, wherein determining said channel quality information ("CQI") values further comprise:
calculating single-user channel quality information ("SU-CQI) values, multiple-user channel quality information ("MU-CQI") values or both to determine said CQI values.

27. The method of claim 25, wherein providing said channel quality information ("CQI") values further comprise:
providing single-user channel quality information ("SU-CQI") values and CQI difference values, wherein said CQI difference values represent the difference between said SU-CQI values and multiple-user channel quality information ("MU-CQI") values.

28. The method of claim 25, further comprising:
determining a precoding matrix index ("PMI") value; and
providing said PMI value to said base station consistent with the MIMO feedback mode of said wireless device.

29. The method of claim 25, further comprising:
determining a rank indicator ("RI") value; and
providing said RI value to said base station consistent with the MIMO feedback mode of said wireless device.

30. The method of claim 25, wherein said configuration information further includes a pre-coding matrix index ("PMI") value, a rank indicator ("RI") value or both.

* * * * *